United States Patent [19]

Kozuki et al.

[11] Patent Number: 4,507,689
[45] Date of Patent: Mar. 26, 1985

[54] COMPONENT VIDEO SYSTEM AND ARRANGEMENT FOR INTERCONNECTING THE SAME

[75] Inventors: Susumu Kozuki; Hiroyuki Takimoto; Masaya Maeda, all of Kanagawa, Japan

[73] Assignee: Canon Kabushiki Kaisha, Tokyo, Japan

[21] Appl. No.: 342,204

[22] Filed: Jan. 25, 1982

[30] Foreign Application Priority Data

Jan. 30, 1981 [JP] Japan .................................. 56-13544

[51] Int. Cl.³ ............................................ H04N 5/782
[52] U.S. Cl. ..................................... 360/33.1; 358/906
[58] Field of Search ............... 358/335, 906; 360/33.1; 455/344, 348; 369/7, 11, 12

[56] References Cited

U.S. PATENT DOCUMENTS 3,833,758  9/1974  Ferrari ................................. 358/906
4,031,548  6/1977  Kato et al. ........................... 358/335
4,041,250  8/1977  Sato ................................. 455/344 X
4,057,830 11/1977  Adcock ................................. 358/906

FOREIGN PATENT DOCUMENTS 52-58315  5/1977  Japan .................................. 358/906
56-4992   1/1981  Japan .................................. 358/906

OTHER PUBLICATIONS

Horak et al., "Multichannel Recording Format for a Sampled-Analogcolor Video Signal", Research Disclosure, Jun. 1979, No. 182, pp. 313–316, 358-906.

Primary Examiner—Donald McElheny, Jr.
Attorney, Agent, or Firm—Toren, McGeady and Stanger

[57] ABSTRACT

A video system consisting of a recorder for recording a video signal and component units to be connected to a recorder in such a manner that a modes in a recorder, can be changed over in accordance with an connected component unit.

16 Claims, 8 Drawing Figures

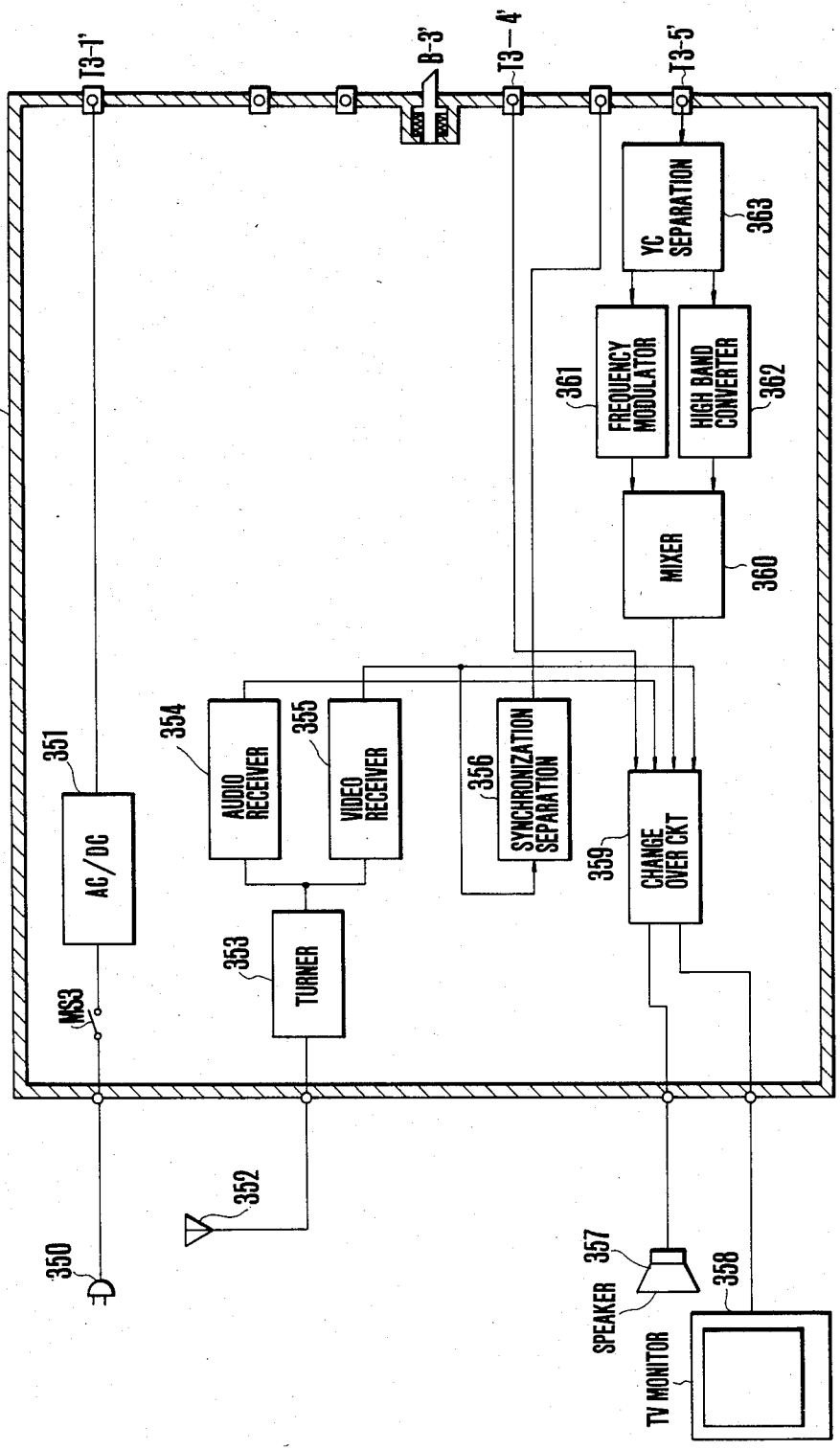

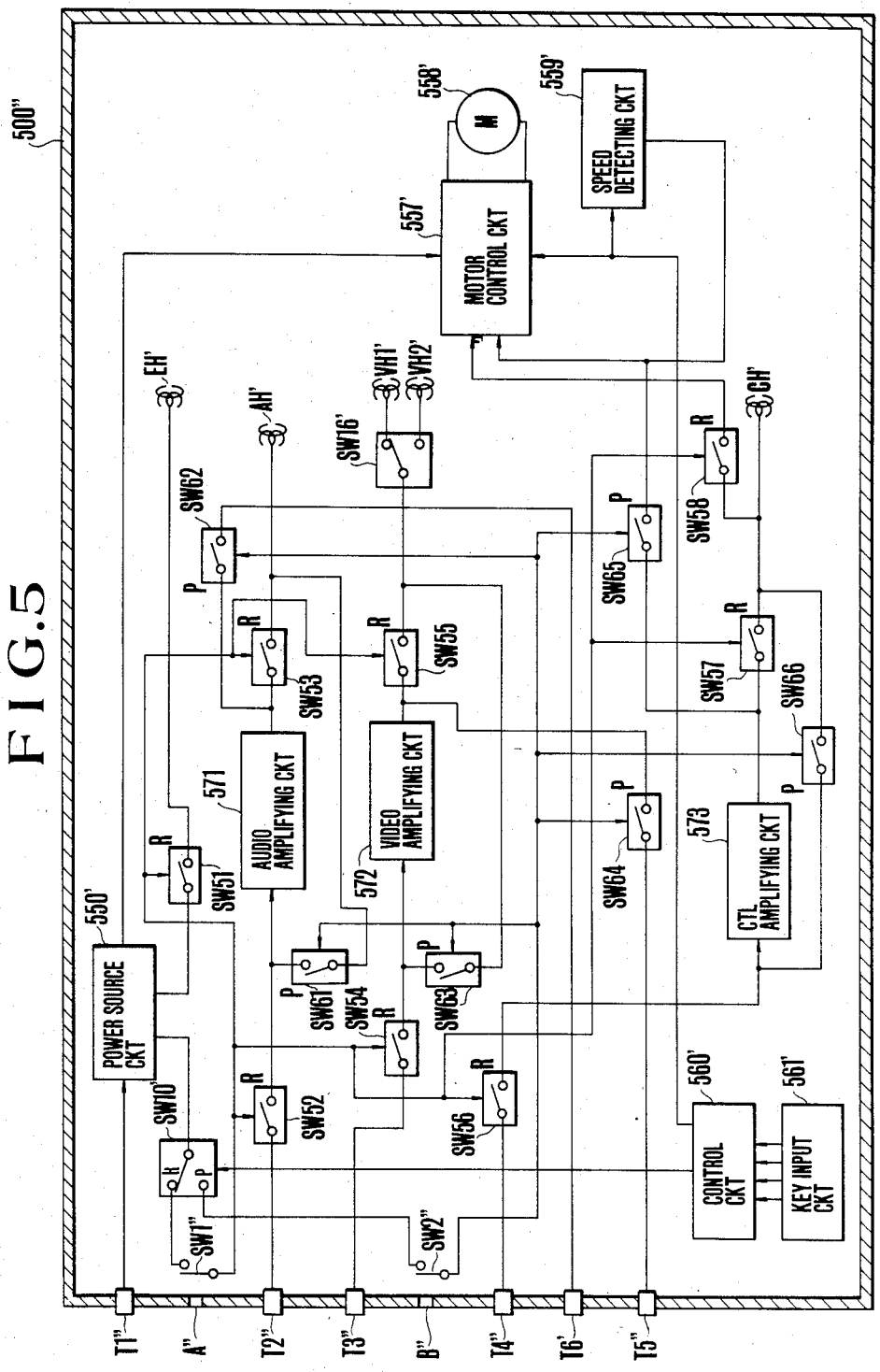
F I G.5

COMPONENT VIDEO SYSTEM AND ARRANGEMENT FOR INTERCONNECTING THE SAME

BACKGROUND OF THE INVENTION

1. Field of the Invention

The present invention relates to a video system consisting of the recorder for recording the video signal, the video camera or the television tuner for delivering the video signal to the recorder or the exclusive video reproducing equipment for delivering the video signal from the recorder to the television monitor.

2. Description of the Prior Arts

Magnetic recording equipment for recording a video signal including the video tape recorder (hereinafter called VTR) is known. Although the VTR is becoming more and more compact and the field application easier and easier, the video camera and the VTR are connected to each other and carried separately resulting in an operability problem when the batteries of the VTR are operated while the camera is being held. Quite recently, a video camera which has a built in VTR has been proposed. However, in this type system, the operability of the video camera is improved, while, at the time of reproduction, it is necessary to handle the video camera carefully because the VTR and the video camera make one body resulting in a reproduction operability problem.

SUMMARY OF THE INVENTION

It is an object of the present invention to provide a handy video system free from the inconvenience of conventional techniques.

A number of the component units can be mounted on the recorder for recording and reproducing the video signal in such a manner that the modes of the recorder can be changed over in accordance with the component unit connected to the recorder.

Other objects and features will be obvious from the explanations made in accordance with the accompanying drawings.

BRIEF DESCRIPTION OF THE DRAWINGS

FIG. 3(D) is a block diagram of exclusive reproducing equipment to be connected to the VTR in FIG. 3(A).

FIG. 5 is a the block diagram of a VTR of still another embodiment.

DETAILED DESCRIPTION OF THE PREFERRED EMBODIMENTS

Figure 1:
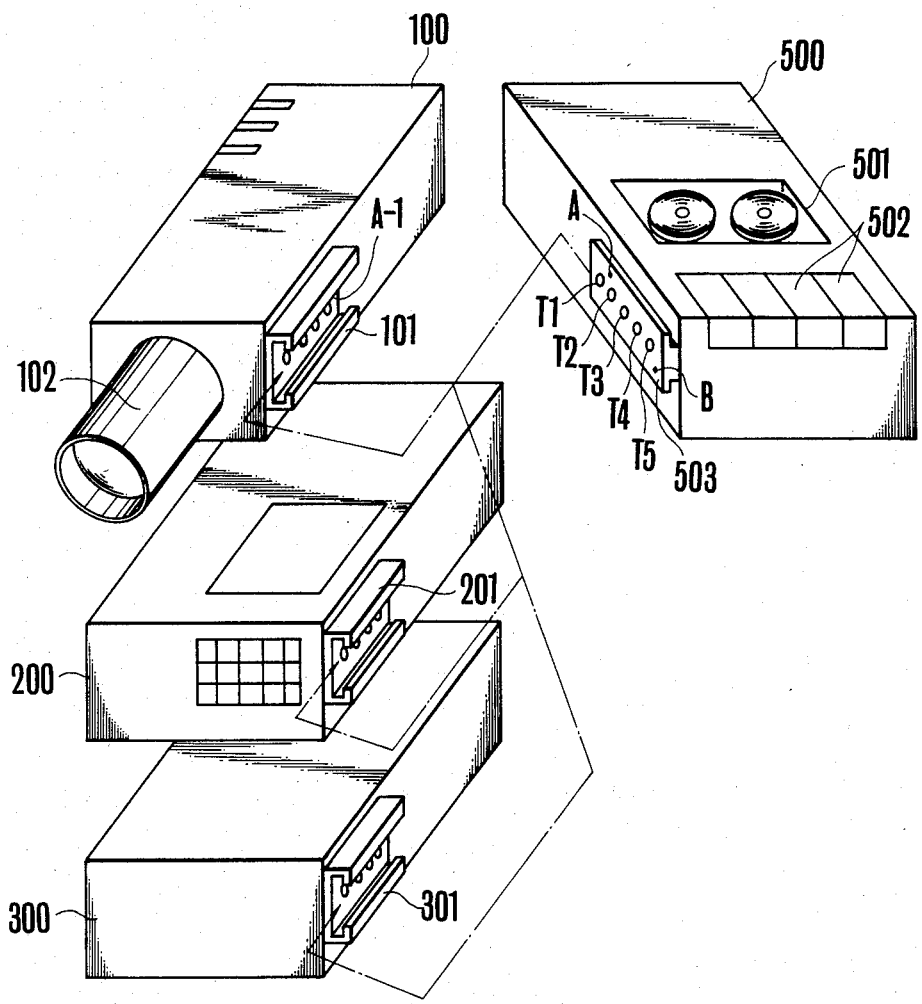
FIG. 1 is a perspective view of the units constituting the video system of a first embodiment.

FIG. 1 shows the connection of the components constituting the video system of the present invention. The video camera 100 is for photographing the object, the television tuner 200 is for detecting a television broadcasting signal, and the exclusive reproducing equipment 300 is for reproducing the image signal from the VTR 500 on a television monitor and (not shown). The VTR 500 has a window 501 for observing the cassette, the operation button 502 and the connector 503, which is selectively inserted into the connector 101 of the video camera 100, connector 201 of the television tuner 200 and connector 301 of the exclusive reproducing equipment 300 (shown with arrows) in such a manner that the terminals T1–T5 are connected.

Figure 2:
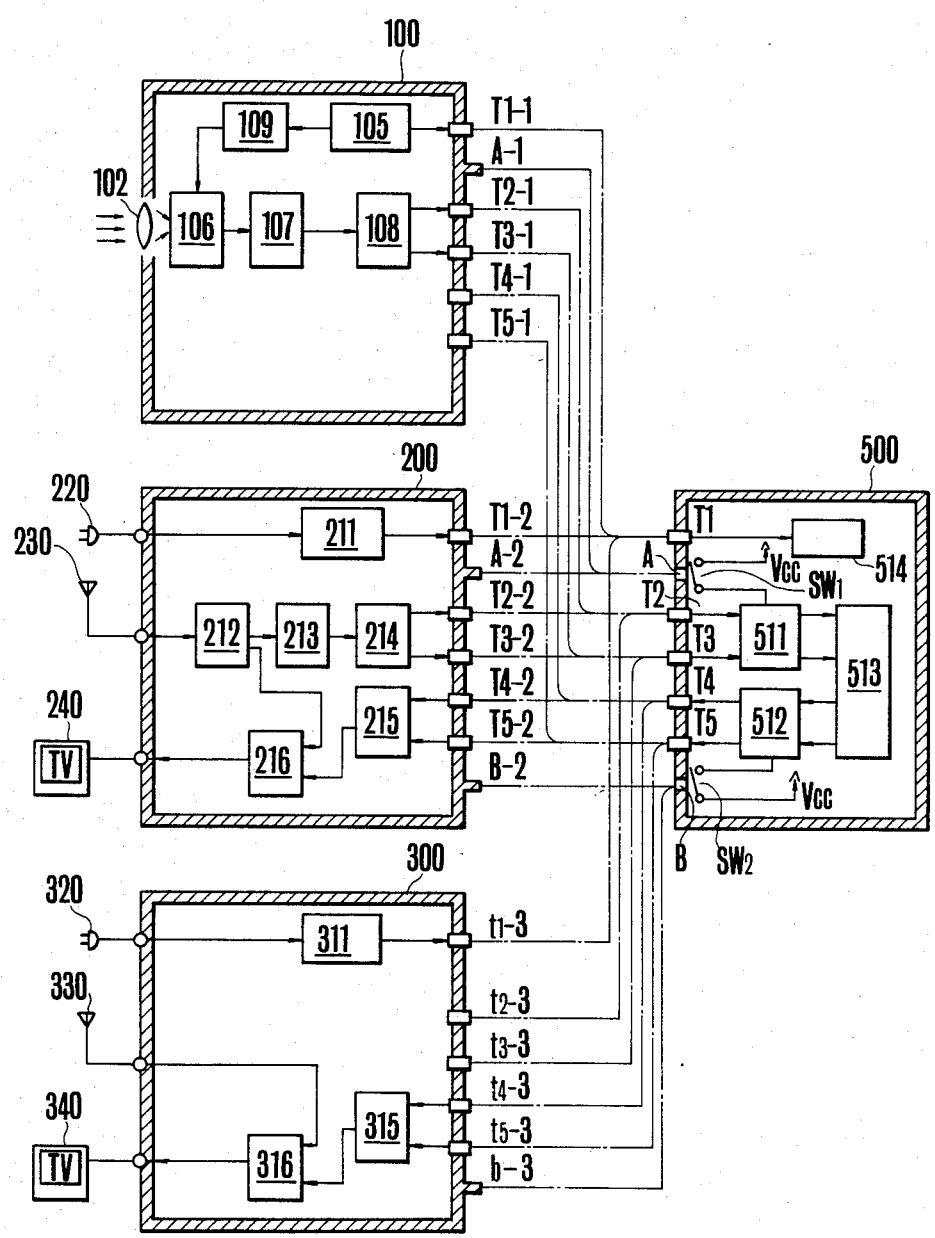
FIG. 2 shows a block diagram of the units in FIG. 1.

FIG. 2 shows the block circuit diagram of the components shown in FIG. 1 and shows the connection between the terminals of the components. In the drawing, 100, 200, 300 and 500 correspond respectively to the video camera, the television tuner, the exclusive reproducing equipment and the VTR, shown in FIG. 1.

In, the first case the connector 503 of the VTR is connected to the connector 101 of the video camera in such a manner that the picture is recorded with the camera connected to the VTR in accordance with FIG. 1 and FIG. 2. The D.C. power source 105, built in the camera 100, delivers a high voltage to the picture pick up tube 106 via the high voltage generator 109 and at the same time, current to the power source circuit 514 of the VTR 500 via the terminals T1-1 and T1. The picture pick up tube 106 in the camera 100 delivers the picture information in a video signal. The image formed with the lens 102 is converted with the conventional television signal producing circuits such as the picture pick up control circuit 107, the video process circuit 108 and so on, to the video signal output terminal T3-1. The sound signal is also delivered to the audio signal output terminal T2-1 in a conventional way. Consequently, the video as well as the audio signal are put into the recording amplifier 511 of the VTR via the terminals T3-1, T3 and T2-1, T2.

The connector 101 of the video camera 100 has a projection A-1 to be inserted into the hole A at the side of the VTR to close the switch SW1. Because SW1 is the operation switch of the recording amplifier 511 of the VTR, the recording amplifier 511 of the VTR assumes operation without fail when the camera 100 is connected to the VTR 500. Thus, the video signal and the audio signal input in the recording amplifier 511 are transferred to the head 513 and recorded on the tape in a conventional way. The reproducing amplifier 512 amplifies the reproduced signal from the head 513. Because the camera 500 is not provided with the projection for closing the switch SW2 in the current supply circuit to the reproducing amplifier 512, the reproducing amplifier 512 remains non-operative.

In the second case the television tuner 200 is connected to the VTR 500 so as to record a picture. When the VTR 500 is connected to the tuner 200, the connector terminals T1–T5 at the side of the VTR 500 are respectively connected to the terminals T1-2–T5-2 at the side of the tuner 200. The projections A-2 and B-2 at the side of the tuner 200 close the switches SW1 and SW2 via the holes A and B. As is shown in the drawing, the tuner 200 has the AC/DC converter 211 for converting the A.C. from the connector 220 connected to the commercial power source into the D.C. for driving the tuner. The output of the converter 211 is delivered to the power source circuit 511 at the side of the VTR 500 via the terminals T1-2, T1. The input signal from the antenna 230 is transferred to the conventional RF demodulation circuit 214 via the distributor 212 and the channel selecting circuit 213. Outputs of the circuit 214 are respectively delivered to the output terminal T3-2 as the video signal output and to the terminal T2-2 as the audio signal output. These video signals and the audio signal are input to the recording amplifier 511 via the terminals T2, T3 at the side of the VTR and recorded in the same process as in the above-mentioned video camera. Because at the time of the reproduction, the switch SW2 of the reproducing amplifier 512 is closed, the reproduced signals from the head 513 are delivered to the terminal T4 as the audio signal and to the terminal T5 as the video signal via the reproducing amplifier 512. Both signals are delivered via the terminals T4-2, T5-2 at the side of the tuner to the RF converter circuit 215, whose output is delivered as the RF output to the video reproduction/television broadcasting change over circuit 216, delivered to the antenna terminal of the television receiver 240 in a conventional way and reproduced as a picture. Futhermore, because the output from the distributor 212 is also delivered to the video/television change over circuit 216, it is possible to reproduce the input signal from the antenna 230 by means of the television receiver 240 via the tuner 200.

By connecting the tuner 200 to the VTR 500 the recording amplifier 511 at the side of the VTR and the reproducing amplifier 512 are switched on enabling both the recording and the reproducing mode of the VTR. Hereby, the recording mode and the reproducing mode are changed over by means of the play key or the recording key of the operation key 502 provided at the side of the VTR. The change over between the reproducing mode and the recording mode inside of the VTR 500 is done in a conventional way.

The exclusive VTR reproducing equipment 300 will now be described. As is clear from comparison with the circuit of the television tuner 200, the exclusive VTR reproducing equipment 300 cannot record television broadcasting from the antenna circuit only, whereby, as already explained in connection with the television tuner 200, the reproducing circuit consists of the RF converter circuit 315 and the video reproduction/television broadcasting change over circuit 316. Consequently, by connecting the exclusive reproducing equipment 300 to the VTR, the projection B-3 at the side of the exclusive reproducing equipment closes the switch SW2 via the hole B at the side of the VTR in such a manner that, as already explained in connection with the tuner 200, the reproduced signal from the VTR 500 is reproduced with the television receiver 340.

Figure 3A:
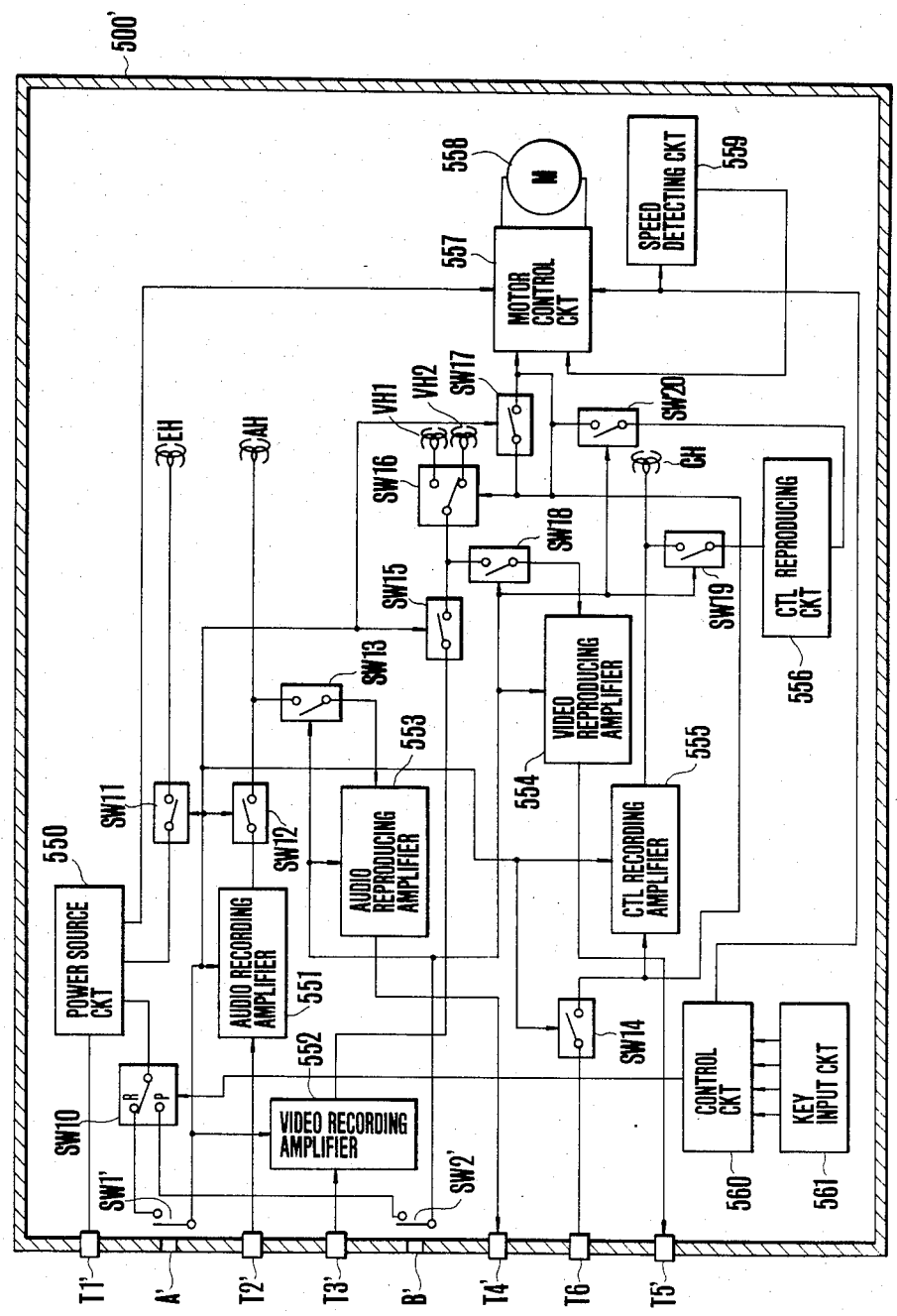
FIG. 3(A) is a block diagram of a VTR of another embodiment.
Figure 3B:
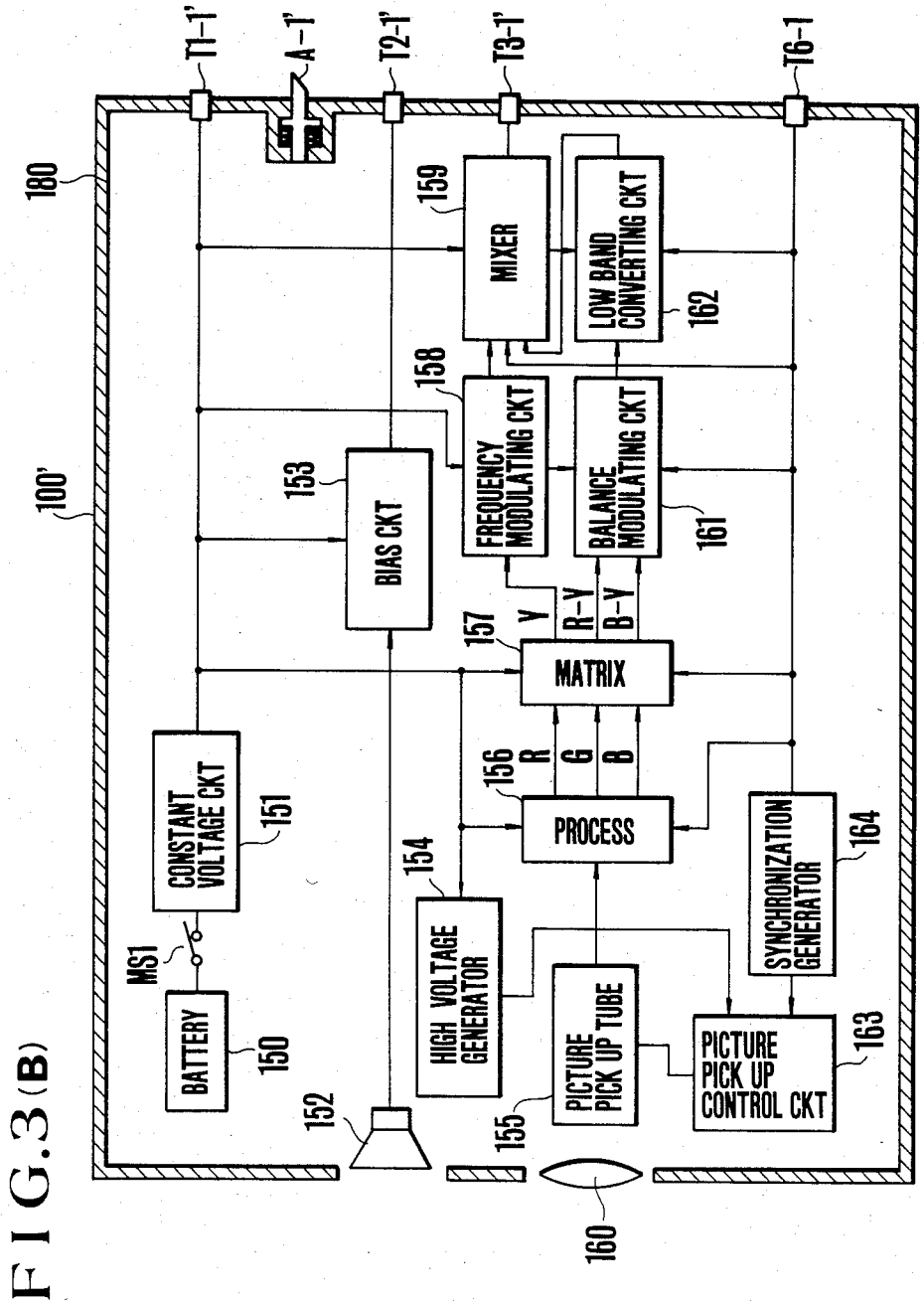
FIG. 3(B) is a block diagram of a video camera to be connected to the VTR in FIG. 3(A).
Figure 3C:
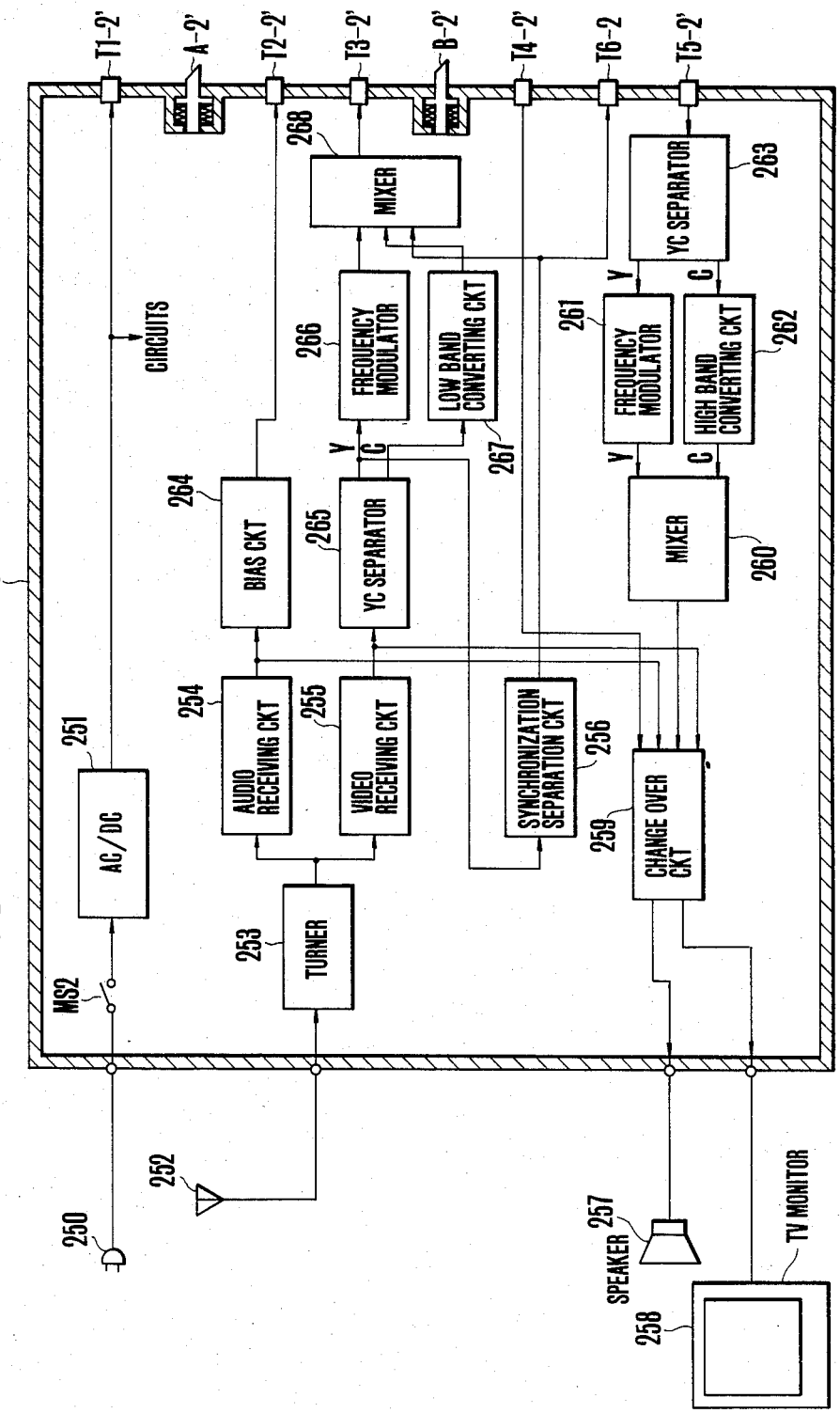
FIG. 3(C) is a block diagram of a tuner to be connected to the VTR in FIG. 3(A).

FIG. 3(A) shows the internal circuit diagram of the VTR 500' of another embodiment of the present invention, FIG. 3(B) that of the video camera 100' to be connected to the VTR 500', FIG. 3(C) that of the video tuner 200' to be connected to the VTR 500' and FIG. 3(D) that of the exclusive reproducing equipment 300' to be connected to the VTR 500'.

The VTR 500' shown in FIG. 3(A) includes an erasing head EH. The audio recording and reproducing head AH and the picture recording and reproducing heads VH1 and VH2 are used alternatively for each field of the picture. The apparatus includes a recording and reproducing head CH for the control signal CTL, a motor 588 for rotating the heads VH1 and VH2 in order to record the signal slantly on the magnetic tape by means of the recording and reproducing head CH or reproduce the information from the slant track and the analog switches SW10–SW20. The switch SW10 is the change over switch to be changed over by means of the reproducing signal or the recording signal from the control circuit 560. The head change over switch SW16 changes over the video heads VH1 and VH2 by means of the vertical synchronization signal or the CTL signal. The switches SW1' and SW2' are similar to SW1 and SW2 in FIG. 2, the input or the output terminals T1'–T5' are similar to terminals T1–T5 in FIG. 2, the input terminal T6 of the vertical synchronization signal and the holes A' and B' are similar to holes A and B in FIG. 2.

In operation, the key input information is transferred from the key input circuit 561 to the control circuit 560, which changes over the contact of the change over switch SW10 to the recording key or the reproducing key. When the recording key is depressed, the contact of the switch SW10 is changed over to the terminal R. When at this time the video camera 100' or the tuner 200' is connected to the VTR 500', the switch SW1' is closed in the same way as in the previous embodiment in such a manner that the audio amplifier 551, the video amplifier 552 and the CTL recording amplifier 555 are operative. Furthermore, the switches SW11, SW12, SW14, SW15 and SW17 are closed and the power is supplied to the erasing head EH. Because the SW12 is closed while the SW13 is opened, the audio head AH is in the recording mode. Furthermore, because the SW15 is closed while the SW18 is opened, the video heads VH1 and VH2 are also in the recording mode. Also, because the SW12 is closed while the SW20 is opened, the CTL head CH is in the recording mode. The speed control circuit 557 controls the speed of the motor 558 by means of the output of the speed control circuit 559 and the vertical synchronization signal which is connected through the switch SW14.

When the SW1' is not closed even if the recording key is depressed, namely when the video camera 100' or the tuner 200' is not connected and when the main switches MS1 and MS2 are not closed even if the video camera 100' or the tuner 200' are not connected, the VTR 500' is not in the recording mode.

When the reproducing key is depressed, the switch SW10 changes over to the contact P, the tuner 200' or the exclusive reproducing equipment 300' connected to the VTR 500' and the main switches MS2 and MS3 closed, the VTR 500' assumes the reproducing mode. Along with the closure of the SW2, the audio reproducing amplifier 533, the video reproducing amplifier 554 and the CTL reproducing amplifier 556 are supplied with power to be operative. Then the switch SW11 is in the opened state and the erasing head EH is supplied with the erasing current. Furthermore, because the switch SW12 is opened while the switch SW13 is closed, the audio head AH assumes the reproducing mode. Furthermore, because the switch SW15 is opened while the SW18 is closed, the video heads VH1 and VH2 also assume the reproducing mode. Because the switch SW14 is opened while the switch SW19 is closed, the CTL head CH also assumes the reproducing mode. Furthermore, the servo-control of the motor 558 is also carried out by means of the output of the speed detecting circuit and that of the CTL reproducing amplifier 556.

The video camera 100' is in accordance with the circuit diagram in FIG. 3(B). In the drawing, is 152 the microphone, 160 the lens system, 160 the main switch, MS1 are the output terminals T1-1'–T3-1' are similar to T1-1–T3-1 and the output terminal of the vertical synchronization signal is T6-1. Along with the closure of the main switch MS1 the output voltage of the battery 150 is delivered to the constant voltage circuit 151, whose output voltage is delivered to the power source circuit of the VTR 500' via the terminal T1-1', and also to the circuits in the video camera 100'. The sound is delivered from the microphone 152, being high frequency biased in the bias circuit 153, to the audio head AH of the VTR 500' via the output terminal T2-1' to be recorded on the magnetic tape.

Furthermore, the output of the constant voltage circuit 151 is converted into a high voltage in the high voltage producing circuit 154 to be delivered to the picture pick up control circuit 163, to whose other input terminal, the synchronization signal is delivered from the synchronization signal producing circuit 164. The control circuit 163 controls the picture pick up tube 155 by means of both signals. The video signal obtained with the picture pick up tube 155 is converted into the color signals R, G and B in the video process circuit 156 and then converted into the brightness signal Y and the color difference signals R-Y and B-Y in the matrix circuit 157. The color difference signals are further balance modulated in the balance modulating circuit 161 and then converted into the low frequency range to be recorded on magnetic tape. The brightness signal is frequency modulated in the frequency modulating circuit 158. The low frequency converted color difference signal and the frequency modulated brightness signal are mixed in the mixing circuit 159. This mixed video signal is delivered to the video heads VH1 and VH2 via the output terminal T3-1', the input terminal T3' at the side of the VTR 500' and so on to be recorded on the magnetic tape.

Furthermore, the casing 180 is provided with a projecting pin A-1' for bringing the VTR 500' into the recording mode.

The operation of the circuit of the television tuner 200' will be explained by reference to FIG. 3(C). The alternating current is delivered from the commercial power lines to the AC/DC converter 251 via the connector 250 and the main switch MS2. The converter 251 supplies the direct current to the circuit in the VTR 500' and the tuner 200'.

The television signals coming from the broadcasting stations and picked up by the antenna are detected with the tuner in such a manner that only one audio signal is taken out by the audio receiving circuit 254, whose output is, being high frequency biased, delivered to the audio head AH of the VTR 500'. On the other hand, for example, the NTSC color signal is taken out of the color video signal in the video receiving circuit 255 and delivered to the YC separating circuit 265, which consists of a high pass filter and a low pass filter to divide the signal into the brightness signal Y and the color signal C. The brightness signal Y is frequency modulated in the frequency modulator 266, while the color signal C is converted in the low band converting circuit 267 into a frequency range lower than the frequency band of the frequency modulated brightness signal. Furthermore, the brightness signal Y is delivered to the synchronization separating circuit 256, which takes out the vertical synchronization signal to be delivered to the VTR 500'. The synchronization signal, the frequency modulated brightness signal and the low band converted color signal are mixed in the mixer 268 and delivered to the video heads VH1 and VH2 of the VTR 500' via the terminal T3-2'.

The reproduced video signal is delivered from the video heads VH1 and VH2 to the terminal T5-2', and separated in the YC separating circuit 263 into the brightness signal Y and the color signal C, while the modulated brightness signal is demodulated in the frequency demodulating circuit 201 and the band converted color signal C is converted in the high frequency band converting circuit 262 into a high frequency band. Furthermore, the brightness signal Y and the color signal C are mixed in the mixer 260 to deliver the NTSC color television signal to the change over circuit 259. Furthermore, the reproduced audio signal input in the terminal T4-2' is directly delivered to the change over circuit 259. The audio signal from the audio receiving circuit 254 and the color television signal from the video receiving circuit 255 are also delivered to the change over circuit 259.

The change over circuit 259 selects the audio and the color television signal reproduced in the VTR 500' from the antenna input in such a manner that the selected audio signal is reproduced in the speaker 257, while the selected color television signal is reproduced in the television monitor 258.

The exclusive reproducing equipment 300' in FIG. 3(D) corresponds to the television tuner 200' in FIG. 3(C) except the recording circuit has been omitted.

Figure 4:
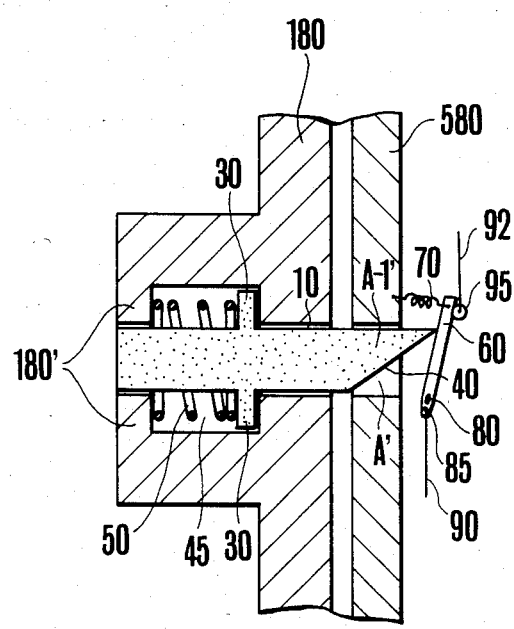
FIG. 4 is a sectional view of a specific construction of the projecting pin.

FIG. 4 shows a sectional view of a specific embodiment of the projecting pin A-1' in FIG. 3(B).

The casing 180 of the video camera 100' is provided with a hole 10 in which the pin A-1' is disposed. The casing 180 includes a step-shaped cross section portion 180'. The pin A-1' has a flange portion 30 for limiting the axial travel. The pin A-1' is normally urged by means of the spring 50 in the direction in which the pin projects. When the pin A-1' is not in contact with the hole 10 at the time of connecting the VTR 500', the pin A-1' is pushed back into the casing 180 due to the tapered portion 40.

After the pin A-1', is inserted into the hole 10, depresses the metal piece 60 corresponding to the switch SW1' in FIG. 3(A), so as to bring the one end of the metal piece 60 (corresponding to the insert electrode 60) and connects the electrodes 60 and 85. Because the metal piece 60 is normally urged by means of the spring 70 toward the casing 580, there is no conductivity between the electrodes 60 and 85 when the pin A-1' is not inserted into the hole 10.

Although only the pin A-1' is described in detail, the construction is the same as that of pins A-2' and B-2' respectively in FIG. 3(C) and FIG. 3(D).

FIG. 5 shows a circuit diagram of still another embodiment.

The elements having the same figures (without adding the prime mark (')) as those in FIG. 3(A) are the same elements. In the drawing, the switches SW51-SW58 are closed when the recording mode is selected by means of the key input circuit 561' of the VTR 500' while the video camera 100' or the television tuner 200' is connected. The switches SW61-SW66 are closed when the reproducing mode is selected by means of the key input circuit 561' of the VTR 500' while the television tuner 200' or the exclusive reproducing equipment 300' is connected.

In the recording mode, the audio amplifying circuit 571 amplifies the input at the input terminal T2" to carry out the audio recording by means of the audio head AH'. Furthermore, in the reproducing mode, the audio amplifying circuit 571 amplifies the reproduced output of the audio head AH' to be delivered to the audio output terminal T4".

On the other hand, the video amplifying circuit 572 amplifies, in the recording mode, the input at the video input terminal T3" to carry out the video recording by means of the video heads VH1' and VH2'. In the reproducing mode the reproduced outputs of the video heads VH1' and VH2' are amplified to be delivered to the video output terminal T6'.

Furthermore, in the recording mode, the CTL amplifying circuit 573 amplifies the vertical synchronization signal input in the terminal T6' and delivered to the CTL head CH' and to the motor control circuit 557', which controls the speed of the drum motor 558'. In the reproducing mode, the reproduced CTL signal of the head CH' is amplified and delivered to the motor control circuit 557', which controls the speed of the drum motor 558'.

In accordance with the present embodiment, the amplifying circuit for recording can be used in common with that for the reproducing, whereby the amplifying circuit can be changed over in accordance with the connected equipment.

In accordance with the present invention, by selectively connecting the recorder to the reproducing system component such as the video camera, the television tuner and the exclusive reproducing equipment, the mode of the recorder can be changed over. A universal compact recording and reproducing video system can be realized by connecting the video camera to the recorder in video recording, the recorder to the exclusive reproducing equipment in reproducing the video signal on the television tube or the recorder to the television tuner in recording of television broadcasting. Furthermore, in accordance with the recording, the reproducing or the recording and also with the reproducing mode the change over of the recording and the reproducing circuit at the side of the recorder can only be carried out automatically and surely by connecting respective units. Further, because the power is delivered from the units connected to the recorder, unnecessary power consumption is decreased.

The amplifying circuit for recording can be used in common with that for reproduction, so the circuit construction in the recorder can be simplified.

Furthermore, by amplifying the signal in the video camera the circuit construction of the recorder can be further simplified. At the same time, it is not necessary to provide the color signal such as NTSC in the video camera and it is sufficient to produce the signal to be directly recorded resulting in a rationalized system.

The present invention is not limited to the above embodiments but can be realized in many variations which utilize the gist thereof.

What is claimed is:

1. A video signal recording and reproducing system consisting of a plurality of components, comprising:
   (a) a recording and reproducing apparatus comprising recording means for recording input video signals on a recording medium, reproducing means for reproducing the recorded video signals on said recording medium, and a first housing means containing said recording means and reproducing means;
   (b) office selecting means for office selecting one of a plurality of transmitted video signals entering from the outside of said system, supplying means for supplying electrical power to said recording and reproducing apparatus, and a second housing means containing said office selecting means and supplying means;
   (c) mechanical coupling means for fixedly securing said first and second housings to each other;
   (d) electrical coupling means through which are transferred video signals and electrical power, whereby when said mechanical coupling means are operated, an electrical connection is achieved through said electrical coupling means; and
   (e) connecting means for closing a circuit for conducting the electrical power from said supplying means to said recording and reproducing apparatus when coupling is effected by said mechanical and electrical coupling means.

2. A video signal recording and reproducing system according to claim 1, wherein said office selecting means is connected to an antenna.

3. A video signal recording and reproducing system according to claim 2, wherein said supplying means has an AC-DC converter which is connected to a commercial alternating current source to convert the alternating current to a direct current.

4. A video signal recording and reproducing system according to claim 1, wherein said office selecting means further includes RF converting means for RF converting the reproduced video signals of said reproducing means to signals adapted to be displayed on a television display device.

5. A video signal recording and reproducing system according to claim 1, wherein said recording and reproducing apparatus has a plurality of manual switches for controlling the initiation and termination of an operation of each of said recording means and reproducing means.

6. A video signal recording and reproducing system according to claim 5, wherein said recording and reproducing apparatus records video signals on a magnetic tape by said recording means, and said reproducing means reproduces the recorded video signals from said magnetic tape.

7. A video signal recording and reproducing system according to claim 1, wherein said recording means includes a record-processing circuit for processing input video signals, and said reproducing means includes a reproduction-processing circuit for processing the reproduced video signals, whereby a portion of said record-processing circuit and a portion of said reproduction-processing circuit are used in common.

8. A video signal recording and reproducing system according to claim 7, wherein what is commonly used in said two processing circuits is an amplifier circuit for the video signals.

9. A video signal recording and reproducing system according to claim 8, wherein said amplifier circuit has input and output stages, either of which is provided with a switching circuit.

10. A video signal recording and reproducing system consisting of a plurality of components, comprising:
   (a) a recording and reproducing apparatus comprising recording means for recording input video signals on a recording medium, reproducing means for reproducing the recorded video signals from said recording medium, and a first housing means containing said recording and reproducing means;
   (b) a video signal converting device comprising RF converting means for RF converting the reproduced video signals produced from said reproducing means to television signals to television signals to be displayed on a television display device, supplying means for supplying electrical power to said recording and reproducing apparatus, and a second housing means containing said R.F. converting means and said supplying means;
(c) mechanical coupling means for mechanically fixedly securing said first and second housings to each other;
(d) electrical coupling means for transmitting video signals and electrical power therethrough, whereby when said mechanical coupling means are operated, an electrical connection through said electrical coupling means is established; and
(e) connecting means for closing a circuit for conducting the electrical power from said supplying means to said recording and reproducing apparatus when coupling is effected by said mechanical and electrical coupling means.

11. A video signal recording and reproducing system according to claim 10, further including first enabling means for rendering said reproducing means operative when said first and second housing means are coupled to each other.

12. A video signal recording and reproducing system according to claim 10, wherein said converting device further includes office selecting means for selecting one office of a plurality of offices of video signals transmitted from outside of said system.

13. A video signal recording and reproducing system according to claim 10, further including a video camera having image pickup means receptive of an image of an object to be photographed for producing video signals corresponding to said object image, a third housing for containing said image pickup means, and a third coupling means positioned on said third housing to connect said third housing directly to said first coupling means.

14. A video signal recording and reproducing system according to claim 13, further including second enabling means for rendering said recording means operative when said first and third housing means are coupled to each other.

15. A video signal recording and reproducing system according to claim 14, further including first disenabling means for rendering said reproducing means inoperative when said first and third housing means are connected to each other.

16. A video signal recording and reproducing system according to claim 15, wherein said first disenabling means inhibits electrical power from being supplied to said reproducing means.

* * * * *